(12) United States Patent  
Fujii (10) Patent No.: US 6,204,842 B1  
(45) Date of Patent: Mar. 20, 2001

(54) SYSTEM AND METHOD FOR A USER INTERFACE TO INPUT URL ADDRESSES FROM CAPTURED VIDEO FRAMES

(75) Inventor: Toshiya Fujii, Menlo Park, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/167,374

(22) Filed: Oct. 6, 1998

(51) Int. Cl.⁷ ........................................................ G06F 3/00
(52) U.S. Cl. ................................ 345/327; 348/13
(58) Field of Search ....................... 345/327, 329, 345/335, 339, 340, 346, 357; 348/7, 12, 13, 552, 569, 18, 559

(56) References Cited

U.S. PATENT DOCUMENTS

| | | | |
|---|---|---|---|
| 5,635,979 | * | 6/1997 | Kostreski et al. ............... 348/13 |
| 5,666,293 | * | 9/1997 | Metz et al. ..................... 709/220 |
| 5,729,549 | * | 3/1998 | Kostreski et al. .............. 370/522 |
| 5,768,539 | * | 6/1998 | Metz et al. ..................... 709/249 |
| 5,903,816 | * | 5/1999 | Broadwin et al. .............. 455/3.1 |
| 5,929,850 | * | 7/1999 | Broadwin et al. .............. 345/327 |
| 5,978,855 | * | 11/1999 | Metz et al. ..................... 709/249 |

* cited by examiner

*Primary Examiner*—Crescelle N. dela Torre
(74) *Attorney, Agent, or Firm*—Gregory J. Koerner; Simon & Koerner (57) ABSTRACT

A system and method for a user interface to input URL address data obtained from captured video frames while simultaneously viewing a television broadcast, the system having a television with associated television screen, a set-top box, and a remote control. The invention also includes means for initiating a video-viewing mode (where the television receives a television signal via the set-top box and displays the television signal on the television screen), a capture manager for capturing image data frames from the television signal, an interface manager for displaying information windows on the display screen, and a search manager for retrieving data pages from a networked source such as the Internet.

26 Claims, 10 Drawing Sheets

SYSTEM AND METHOD FOR A USER INTERFACE TO INPUT URL ADDRESSES FROM CAPTURED VIDEO FRAMES

BACKGROUND OF THE INVENTION

1. Field of the Invention

This invention relates generally to electronic systems that access and use information obtained from the Internet, and relates more particularly to a system and method for a user interface to input URL address data obtained from captured video frames while simultaneously viewing a television broadcast.

2. Description of the Background Art

A variety of information is readily available from various types of electronic networks, such as the Internet, which are typically accessible through a compatible computer device or other similar electronic system. With the increase in the use of the Internet, television producers are including related references to the Internet in their television broadcasts to provide viewers with information to access the relevant Internet locations.

A contemporary method for accessing information available on the Internet consists of a basic television set for displaying Internet information and a "set-top box" for accessing selected information from the Internet. The set-top box provides the accessed information to the corresponding television set for display. A set-top box is typically a relatively small and economical device that is located near the television set to serve as an efficient interface with the Internet in consumer home-use applications.

Figure 1:
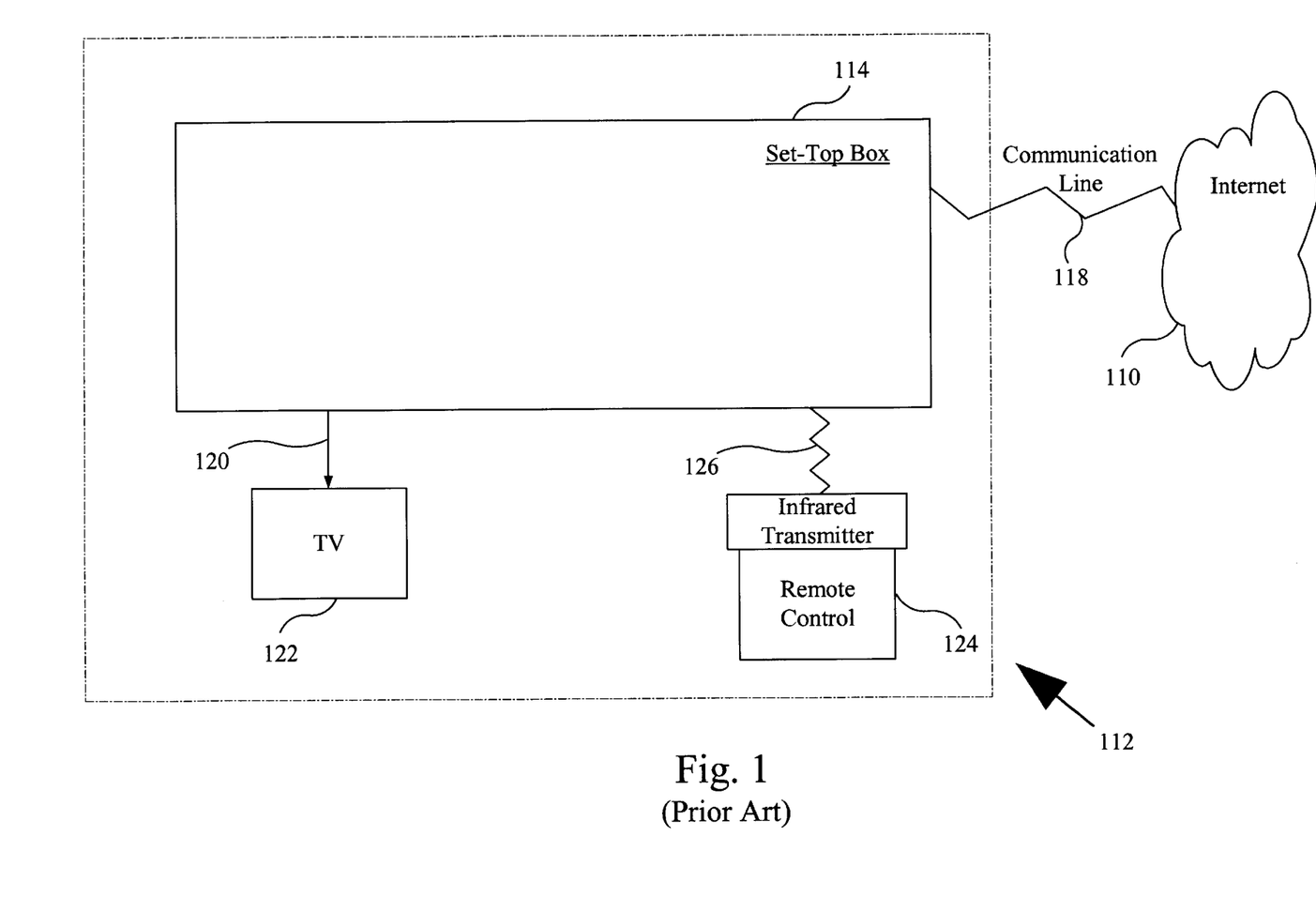
FIG. 1 is a block diagram of a basic set-top box.

Referring to FIG. 1, a block diagram of a set-top box system 112 is shown in which the user controls access to Internet data pages by the use of a remote control 124 and views the data pages on the television (TV) 122. In the preferred embodiment, the data pages are hypertext pages (web pages) retrieved from the Internet 110. Set-top box 114 connects to the Internet 110 via a communication line 118. When the system user manipulates remote control 124 to access a particular Internet page on a particular server, set-top box 114 converts the user input into an address called a Uniform Resource Locator (URL). The URL causes the specified remote server to respond and transmit the specified Internet page (web page) via the Internet 110 to set-top box 114. Set-top box 114 then converts this digital data into an analog format suitable for display on the attached TV screen. The selected Internet pages may contain a variety of textual and graphics information in various appropriate formats.

After accessing the selected Internet pages, set-top box 114 then provides the accessed pages to television 122 via line 120 for display to system viewers. Remote control 124 is preferably a wireless device that includes an infrared transmitter unit by which a system user may input various types of information via transmission path 126 to control the operation of set-top box 114 and television 122. In the FIG. 1 embodiment, remote control 124 is typically a relatively simple input device that features only a limited number of input keys to accommodate normal consumer home-use applications.

However, viewing and manipulating the stored pages of Internet information using system 112 of FIG. 1 is a relatively laborious and cumbersome process. During the TV broadcast, if the system user wishes to retrieve some information concerning the TV broadcast (for example, the background of a particular actor or the statistics of an athlete), the system user must record the particular URL address displayed on the screen. When a URL address is displayed on the television viewing screen, the user must search for a means to record the URL address and accurately record the address. The user may inaccurately record the URL address or may not record the entire address before the television viewing screen changes and no longer displays the address. In either case, the user is unable to retrieve the desired information. In addition, the user must either interrupt his or her viewing of the TV broadcast to perform an Internet search or the system user must wait until a convenient break in the TV broadcast to perform the Internet search.

The ability to access the Internet while simultaneously watching a television program would provide a more efficient and effective method for utilizing Internet information. Thus, for the foregoing reasons, an improved system and method are needed for a user interface to enter the URL address data obtained from captured video frames without interrupting viewing of the television programming.

SUMMARY OF THE INVENTION

This invention relates generally to electronic systems that access and use information obtained from the Internet and more particularly to a system and method for a user interface to input URL address data obtained from captured video frames while simultaneously viewing a television broadcast.

Initially the system waits for a user to input commands from a remote control during video-viewing mode and displays a video-viewing mode screen on the TV. A capture manager then acquires the current video-viewing mode screen and saves the captured video frame in a video frame buffer. The capture manager continues to acquire and save the video-viewing mode screens until the user presses the FREEZE button on the remote control.

Once the user presses the FREEZE button, the capture manager preferably displays a captured video frame window superimposed in the upper right-hand corner of the television viewing screen and displays a URL address input window on the TV, superimposed on the lower portion of the television screen.

The system then waits for the user to input commands from the remote control during an address-input mode. If the user presses a "Prior Image" button on the remote control, the system retrieves the most recent, prior video-viewing mode screen saved in the video frame buffer, displays the retrieved video-viewing mode screen, and waits for further user action.

If the user has not pressed the "Prior Image" button, the system determines if the user has entered text in an address data entry area. If text has been entered, the system displays the entered text in an address entry area and waits for further user action.

Once the user has finished entering text and presses a "Go To Page" button on the remote control, the system enters a web-results mode. During the web-results mode, a search manager manipulates the URL address data entered by the user in the URL address data entry area by first formatting the search text in a proper form for the specified task. In the preferred embodiment, the text is formatted in proper URL format to perform a search on the Internet. The system sends the request to the Internet and acquires an Internet data page.

The search manager then displays the acquired Internet data page as a web page window on a portion of the television viewing screen. In the preferred embodiment, the web page window is superimposed in the upper right-hand corner of the television viewing screen over the TV broadcast screen. The search manager also displays a page information window on the television viewing screen. In the preferred embodiment, the page information window is superimposed on the lower portion of the television viewing screen. Both windows are displayed during the simultaneous display of the TV broadcast signal.

Next, the search manager waits for the user to input commands from the remote control during a web-results mode. If the user presses a "Go To Web" button on the remote control, the search manager responsively displays the acquired Internet data page on the television viewing screen where the Internet data page occupies the entire television screen area. After displaying the Internet data page, the system waits for further user input. At this stage, the user may elect to retrieve other Internet data pages or return to video-viewing mode.

If the user presses "Return To Video" button on the remote control, the search manager displays the video-viewing mode screen on the television viewing screen and returns to video-viewing mode. Otherwise, the search manager waits for the user to input a command on the remote control.

The present invention thus provides an effective user interface to enter the URL address data obtained from captured video frames without interrupting viewing of the TV programming.

DETAILED DESCRIPTION OF THE PREFERRED EMBODIMENT

The present invention relates to an improvement in television systems that interact with the Internet. The following description is presented to enable one of ordinary skill in the art to make and use the invention and is provided in the context of a patent application and its requirements. Various modifications to the preferred embodiment will be readily apparent to those skilled in the art and the generic principles described here may be applied to other embodiments. Thus, the present invention is not intended to be limited to the embodiment shown, but is to be accorded the widest scope consistent with the described principles and features.

The present invention comprises a system and method for a user interface to input URL address data obtained from captured video frames, while simultaneously viewing a television broadcast. The invention includes a user interface for entering the URL address data, a television with associated television screen, a set-top box, and a remote control. The invention also includes means for initiating a video-viewing mode (where the television receives a television signal via the set-top box and displays the television signal on the television screen), a capture manager for capturing image data frames from the television signal, an interface manager for displaying information windows on the display screen, and a search manager for retrieving data pages from a networked source such as the Internet.

Figure 2:
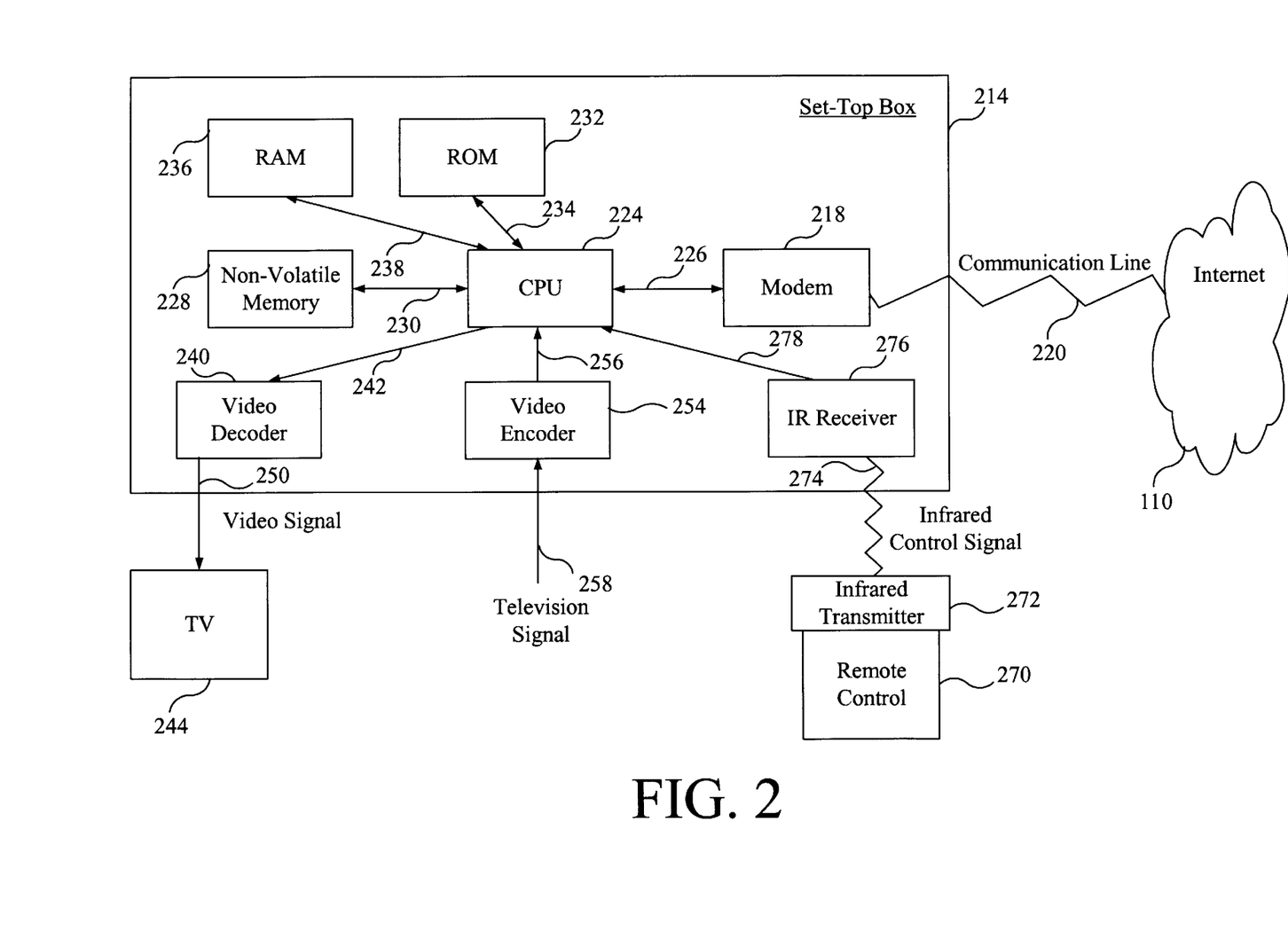
FIG. 2 is a block diagram of a set-top box, according to the present invention.

Referring now to FIG. 2, a block diagram of one embodiment of a set-top box 214 is shown, in accordance with the present invention. The FIG. 2 embodiment includes a set-top box 214, a television (TV) 244, and a remote control 270. Set-top box 214 preferably includes a modem 218, a central processing unit (CPU) 224, a non-volatile memory 228, a read-only memory (ROM) 232, a random-access memory (RAM) 236, a video decoder 240, a video encoder 254, and an infrared (IR) receiver 276.

In operation, a user may advantageously use remote control 270 to input various types of information for controlling the operation of the FIG. 2 system (for example, searching the Internet 110.) Preferably, remote control 270 is a wireless device that includes an infrared transmitter 272 by which an infrared (IR) control signal is propagated to IR receiver 276 via transmission path 274. Remote control 270 is preferably a relatively simple input device that features only a limited number of input keys to accommodate normal consumer home-use applications. Alternatively, remote control 270 may also be implemented using other configurations that have a more complete input system.

In one embodiment, a user of the FIG. 2 system may use remote control 270 for programming set-top box 214 to access and download selected pages of information from Internet 110 while simultaneously viewing a television broadcast. As discussed in reference to FIG. 5(b), the user preferably manipulates infrared transmitter 272 to capture and retrieve video frames from system memory. The video frames contain Internet address or uniform resource locator (URL) information that the user then uses to access selected Internet web pages, in accordance with the present invention. In practice, IR receiver 276 receives the user-generated infrared control signal via transmission path 274, and then provides a converted control signal to CPU 224 via line 278. In response, CPU 224 performs the designated task while the user views the television broadcast, and generates an Internet search signal to modem 218 via line 226, specifying the previously programmed URL.

The present invention then retrieves a selected page of Internet information corresponding to the selected URL address and responsively stores the selected page of Internet information into non-volatile memory 228. Once the Internet information is transferred to non-volatile memory 228, CPU 224 then notifies the user that the information is ready for viewing, as discussed in reference to FIG. 5(c).

Figure 3:
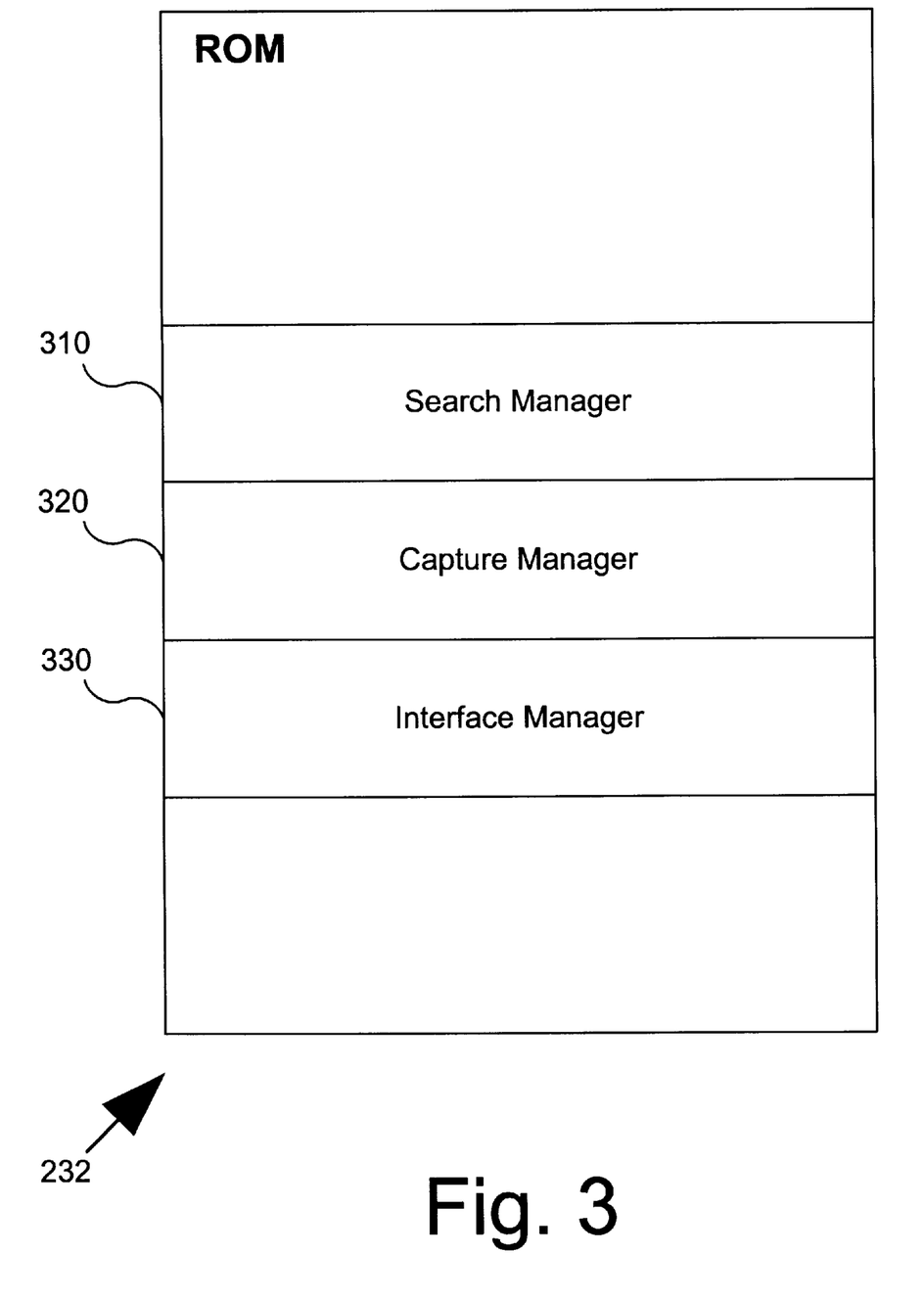
FIG. 3 is a memory map of the read-only memory of FIG. 2.

Referring now to FIG. 3, a memory map of one embodiment of the read-only memory (ROM) 232 of FIG. 2 is shown. In the FIG. 3 embodiment, ROM 232 includes a search manager 310, a capture manager 320, and an interface manager 330. Search manager 310 includes a series of instructions which are executable by CPU 224 to advantageously manipulate search requests generated by the user, transmit the results to the Internet, and acquire and store Internet data pages in non-volatile memory 228. In addition, search manager 310 contains a series of instructions to advantageously present display and manipulate the acquired Internet data page on a TV screen. In the preferred embodiment, search manager 310 transforms and transmits the search request to the Internet 110 while TV 244 simultaneously displays the TV broadcast.

Capture manager 320 includes a series of instructions, which are executable by CPU 224, to capture video frames of a television broadcast that is displayed on television 244. Capture manager 320 then captures a series of video frames while TV 244 simultaneously displays the TV broadcast.

Interface manager 330 includes a series of instructions, which are executable by CPU 224, to display a user interface window on TV 244. In addition, interface manager 330 receives a text-string that is input by the user and responsively displays the corresponding text on the interface window while TV 244 simultaneously displays the TV broadcast. The foregoing processes are further described below in conjunction with FIGS. 7, 8, and 9.

Figure 4:
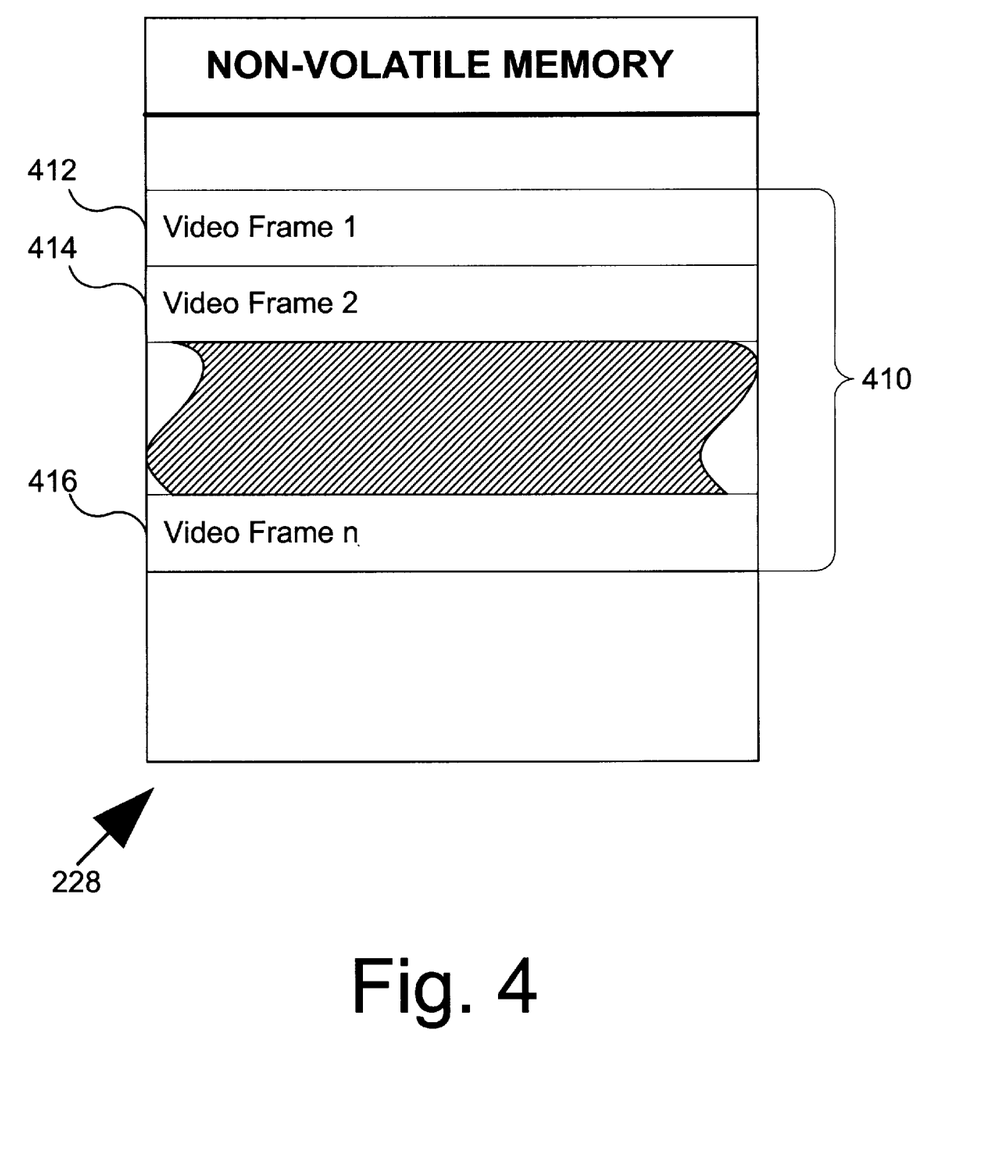
FIG. 4 is a memory map of the non-volatile memory of FIG. 2.

Referring now to FIG. 4, a memory map of one embodiment for non-volatile memory 228 of FIG. 2 is shown. Non-volatile memory 228 preferably includes video frame 1 (412) through video frame n (416); however, in other embodiments, the present invention may readily store video frames 410 in various other quantities and configurations. Non-volatile memory 228 is preferably implemented as a hard disk or as flash memory; however, in alternate embodiments, non-volatile memory 228 may also be configured using any appropriate and compatible type of storage device.

Figure 5A:
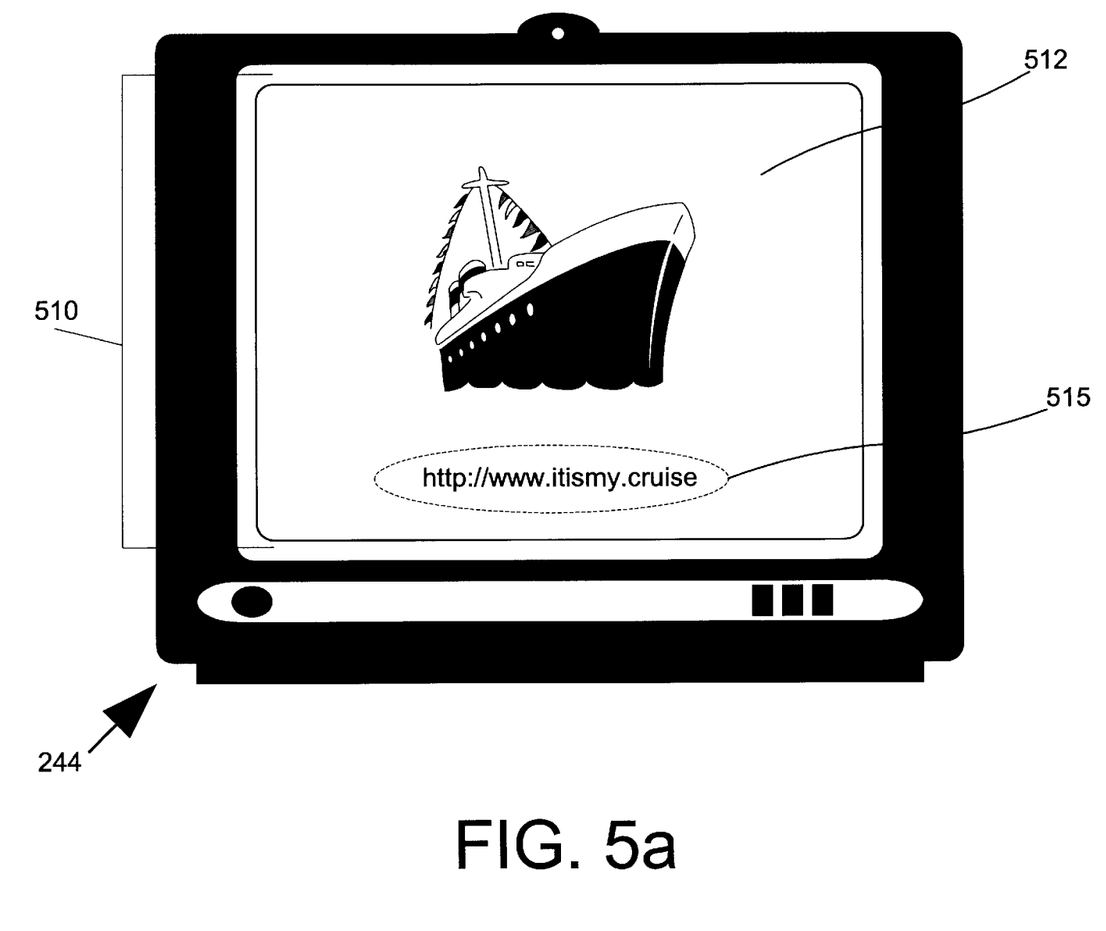
FIG. 5(a) is a representation of the television of FIG. 2 during video-viewing mode, according to the present invention.

Referring now to FIG. 5(a), a representation of television 244 during video-viewing mode is shown. In the FIG. 5(a) representation, video-viewing mode screen 512 is displayed on TV 244 so that the entire viewing screen area of TV 244 is occupied with a display of the current, in-progress TV broadcast or video image. The display may be generated by various means including a standard TV broadcast signal or a cable TV signal. In addition, video-viewing mode screen 512 also contains highlighted URL 515, an Internet data page address, that is contained within the video-viewing mode screen 512. Highlighted URL 515 is part of the image displayed on the TV screen during a TV broadcast and typically is not directly accessible by the user.

Figure 5B:
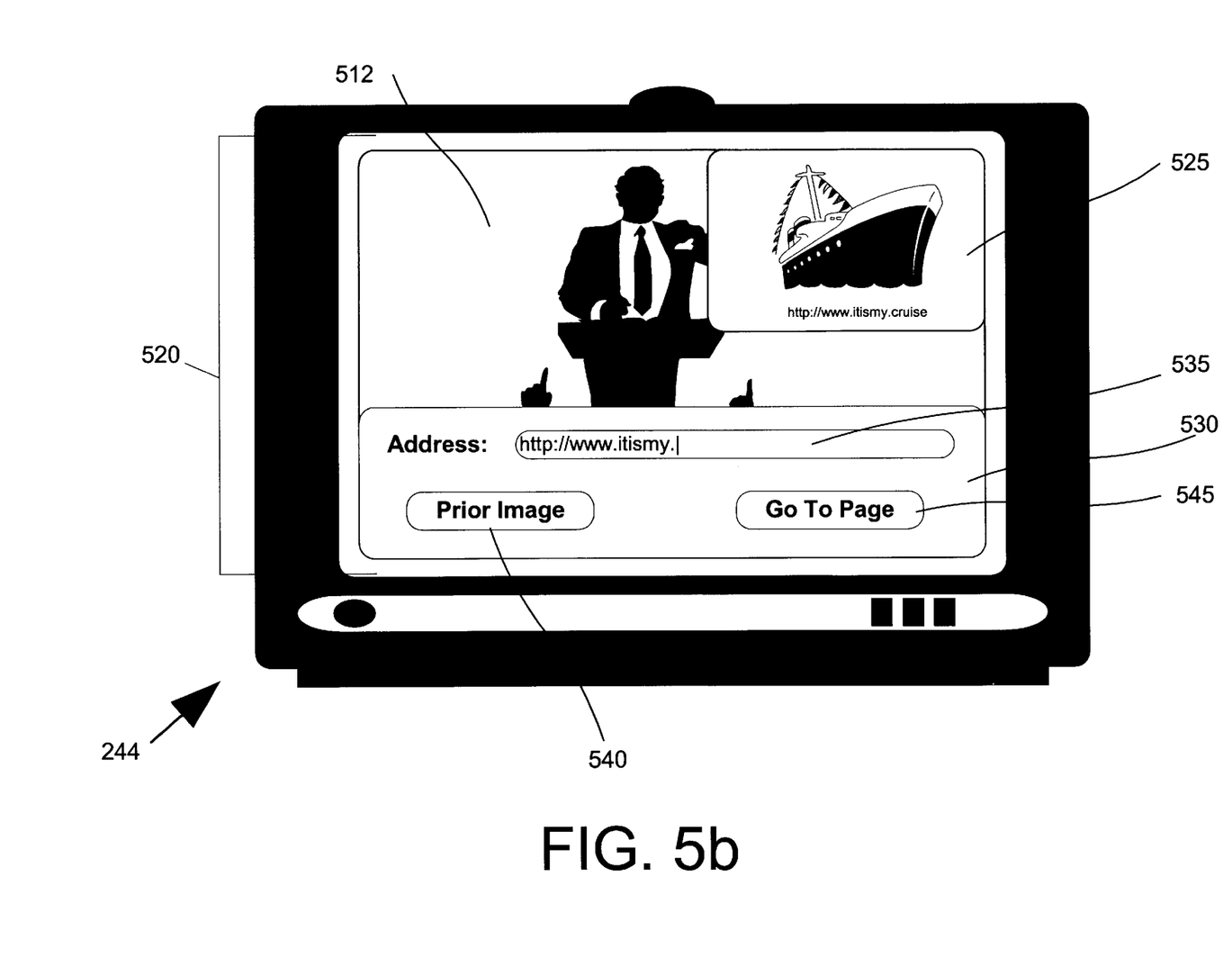
FIG. 5(b) is a representation of the television of FIG. 2 during address-input mode, according to the present invention.

Referring now to FIG. 5(b), a representation of television 244 during address-input mode is shown. In the FIG. 5(b) representation, TV 244 is shown with both URL address input window 530 and captured video frame window 525 superimposed on the TV viewing screen while TV 244 simultaneously displays video-viewing mode screen 512. URL address input window 530 contains address entry area 535 where the user may input text for an Internet search request. Captured video frame window 525 is the most recently captured video frame image that also contains highlighted URL 515. Highlighted URL 515 is an Internet data page address that the user may then easily enter into address entry area 535.

Figure 5C:
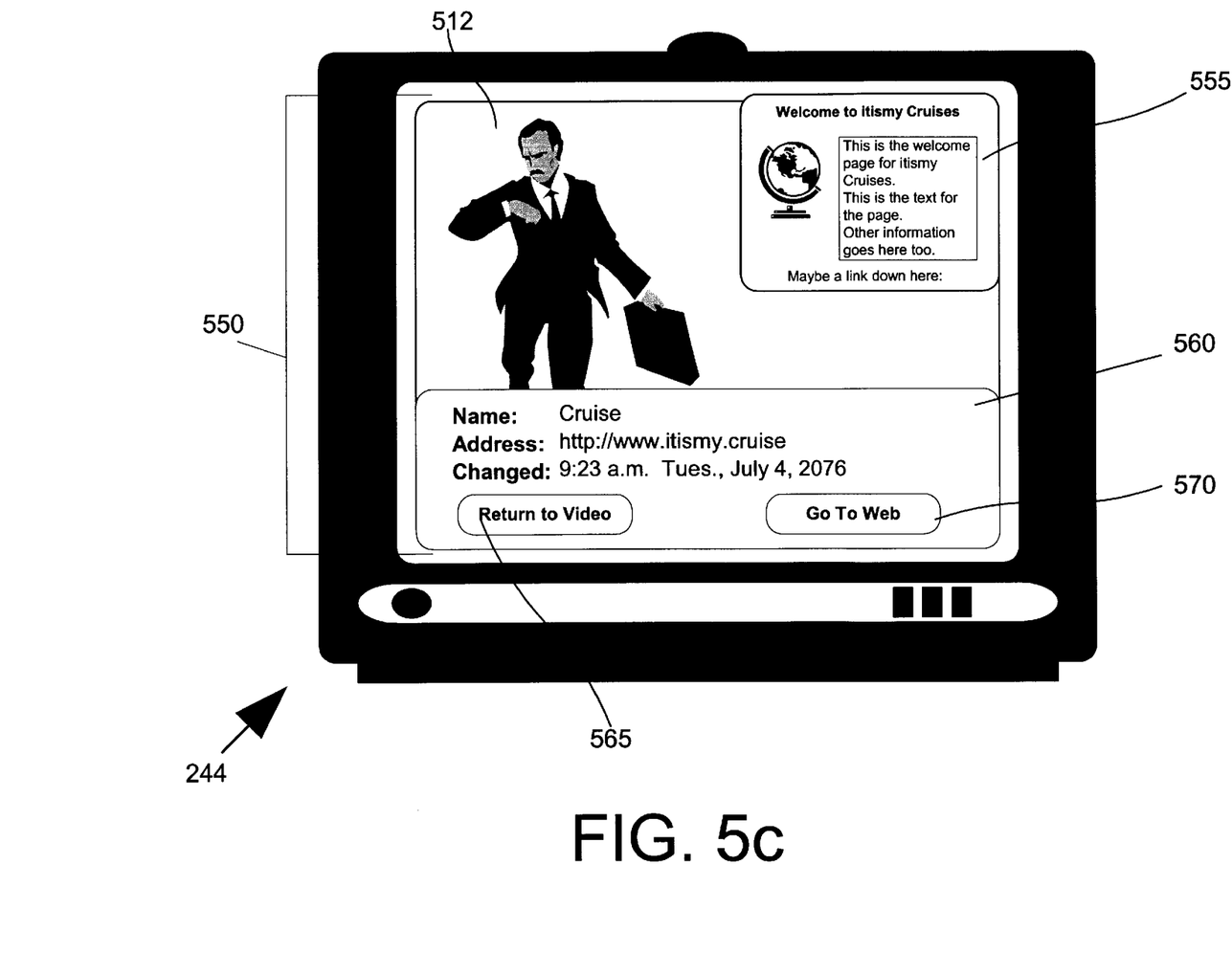
FIG. 5(c) is a representation of the television of FIG. 2 during web-results mode, according to the present invention.

URL address input window 530 also contains "Go To Page" button 545 for initializing the Internet search process for the URL address entered by the user, and for initiating web-results mode (FIG. 5(c)). URL address input window 530 also contains "Prior Image" button 540 for retrieving other video frames (412 through 416) contained in video frame buffer 410. In the preferred embodiment, "Prior Image" button 540 and "Go To Page" button 545 are activated with the use of remote control 270.

Referring now to FIG. 5(c), a representation of television 244 during web-results mode is shown. In the FIG. 5(c) representation, TV 244 is shown with both page information window 560 and web page window 555 superimposed on the TV viewing screen while TV 244 simultaneously displays video-viewing mode screen 512. Web page window 555 is a compressed version of the actual web page retrieved, which is stored in non-volatile memory 228. Page information window 560 contains information about the web page returned as a result of the Internet search. Preferably, page information window 560 displays the name of the web page, the URL address of the web page, and the date and time when the page was retrieved. Page information window 560 also contains "Go To Web" button 570 for displaying the web page represented by web page window 555 in full screen format on television 244, and contains "Return To Video" button 565 for returning television 244 to video-viewing mode (FIG. 5(a)).

Figure 6:
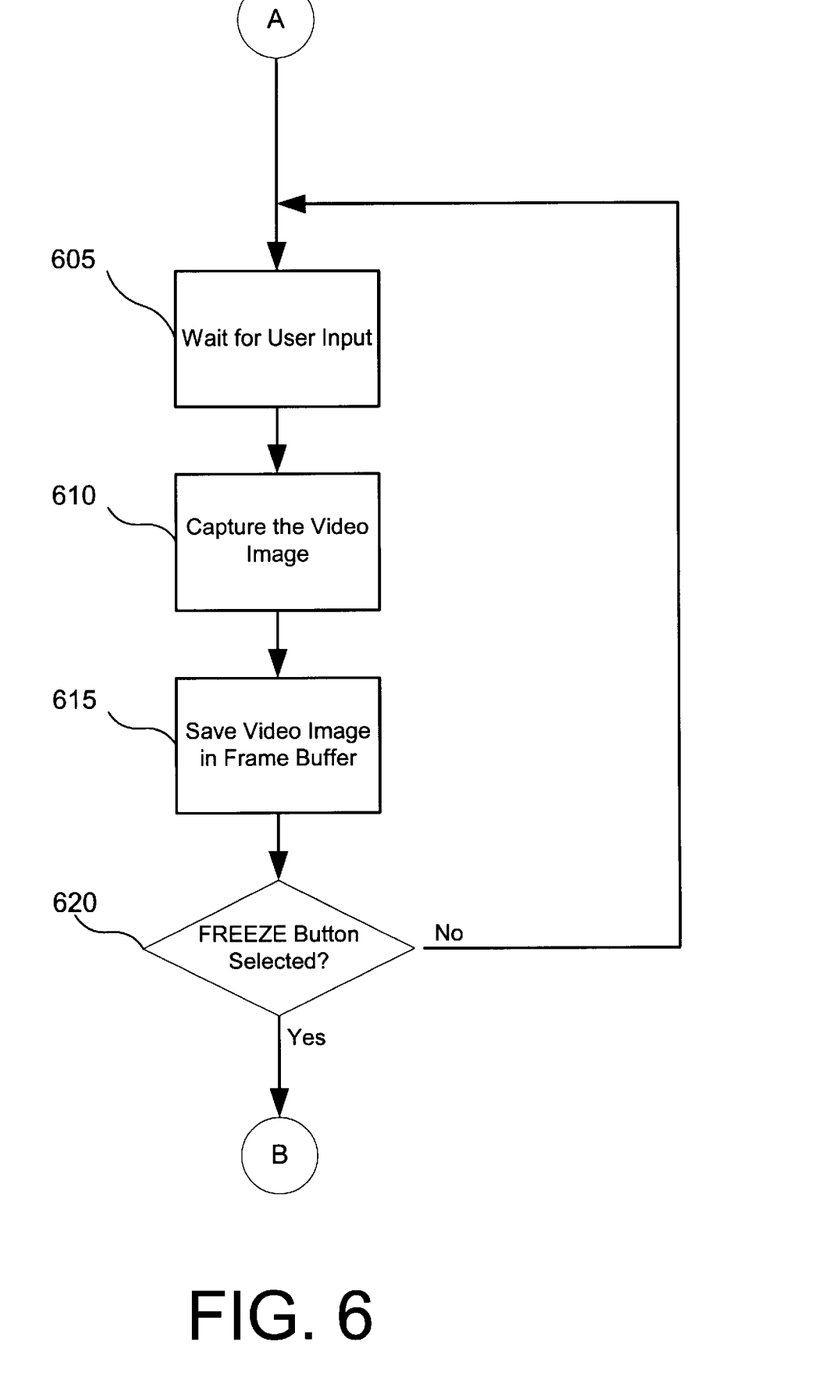
FIG. 6 is a flowchart of the preferred method steps for capturing video frames during video-viewing mode of FIG. 5(a)

Referring now to FIG. 6, a flowchart of the preferred method steps for capturing video frames during video-viewing mode is shown. Initially in step 605, set-top box 214 waits for the user to input commands from remote control 270 during video-viewing mode. At the same time, set-top box 214 displays video-viewing mode screen 512 (FIG. 5(a)) on TV 244 so that the entire viewing screen is occupied with a display of the current, in-progress TV broadcast or video image. In step 610, capture manager 320 acquires the current video-viewing mode screen 512, which preferably contains highlighted URL 515.

Next, in step 615, capture manager 320 saves the captured video frame into video frame buffer 410. In step 620, capture manager 320 determines if the user has pressed the FREEZE button on remote control 270. If the FREEZE button has not been pressed, capture manager continues processing by returning to step 605. If the FREEZE button has been pressed, capture manager 320 processes the steps necessary to perform address-input mode which are detailed in reference to FIG. 7 below.

Capture manager 320 continuously cycles through steps 605 through 620 until the user presses the FREEZE button, acquiring and storing a series of video-viewing mode screens 512 while TV 244 continues to display the TV broadcast. In the preferred embodiment, the system stores the video-viewing mode screens 512 in video frame buffer 410 at a rate of one frame every 0.1 second and stores 50 frames into frame buffer 410. When frame buffer 410 is full, the system replaces the oldest saved video frame (412 through 416) with the current captured video frame from video-viewing mode screen 512.

Figure 7:
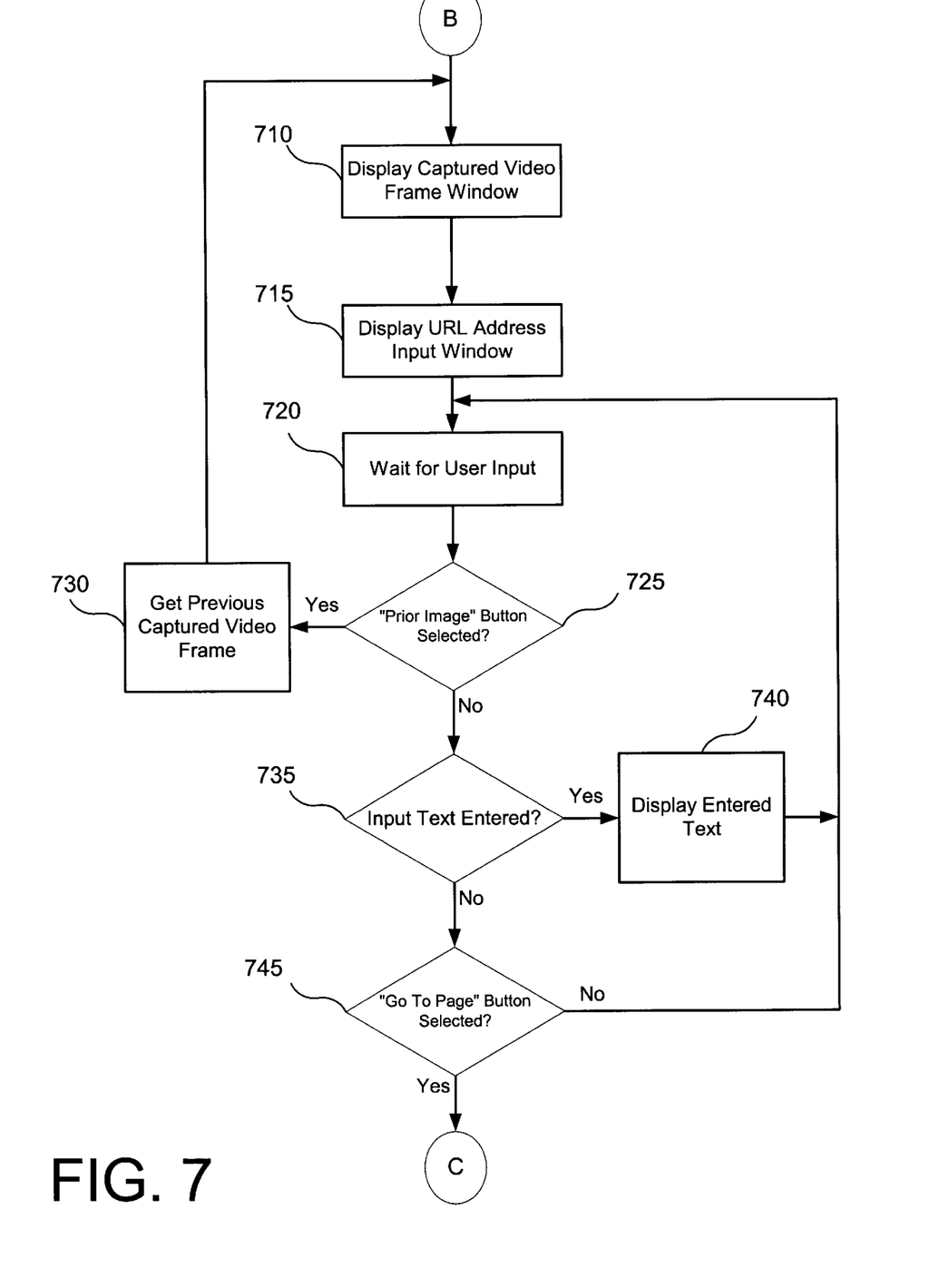
FIG. 7 is a flowchart of the preferred method steps for performing the address-input mode of FIG. 5(b)

Referring now to FIG. 7, a flowchart of the preferred method steps for performing the address-input mode is shown. The present invention processes the FIG. 7 steps after the user has pressed the FREEZE button on remote control 270. Initially, in step 710, capture manager 320 displays the captured video frame window 525 on TV 244 discussed in conjunction with FIG. 5(b). In the preferred embodiment, captured video frame window 525 is superimposed in the upper right-hand corner of the television viewing screen. Captured video frame window 525 is the most recently captured video frame image. Then, in step 715, capture manager 320 displays URL address input window 530 on TV 244 discussed in conjunction with FIG. 5(b). In the preferred embodiment, URL address input window 530 is superimposed on the lower third of the television screen.

Next in step 720, interface manager 330 waits for the user to input commands from remote control 270 during address-input mode. In step 725, interface manager 330 determines if the user has pressed "Prior Image" button 540 on remote control 270. If "Prior Image" button 540 has not been pressed, then interface manager 330 continues processing at step 735. If "Prior Image" button 540 has been pressed, then interface manager 330, at step 730, returns control to capture manager 320 which retrieves the immediately prior video-viewing mode screen 512 that was previously saved into video frame buffer 410 (discussed in reference to FIG. 6) after which capture manager 320 continues processing by returning to step 710.

Next, in step 735, interface manager 330 determines if the user has entered text in address entry area 535. Typically, the user enters highlighted URL 515, an Internet data page address, that is contained within captured video frame window 525. If the user has not entered text in address entry area 535, then interface manager 330 continues processing at step 745. If text has been entered, interface manager 330 displays the entered text in address entry area and continues processing by returning to step 720.

Next, in step 745, interface manager 330 determines if the user has pushed "Go To Page" button 545 on remote control 270 for initializing the Internet search process. If "Go To Page" button 545 has not been pressed, then interface manager 330 continues processing by returning to step 720. If "Go To Page" button 545 has been pressed, interface manager 330 transfers control to search manager 310 which processes the steps necessary to perform web-results mode which are detailed in reference to FIG. 8 below.

Figure 8:
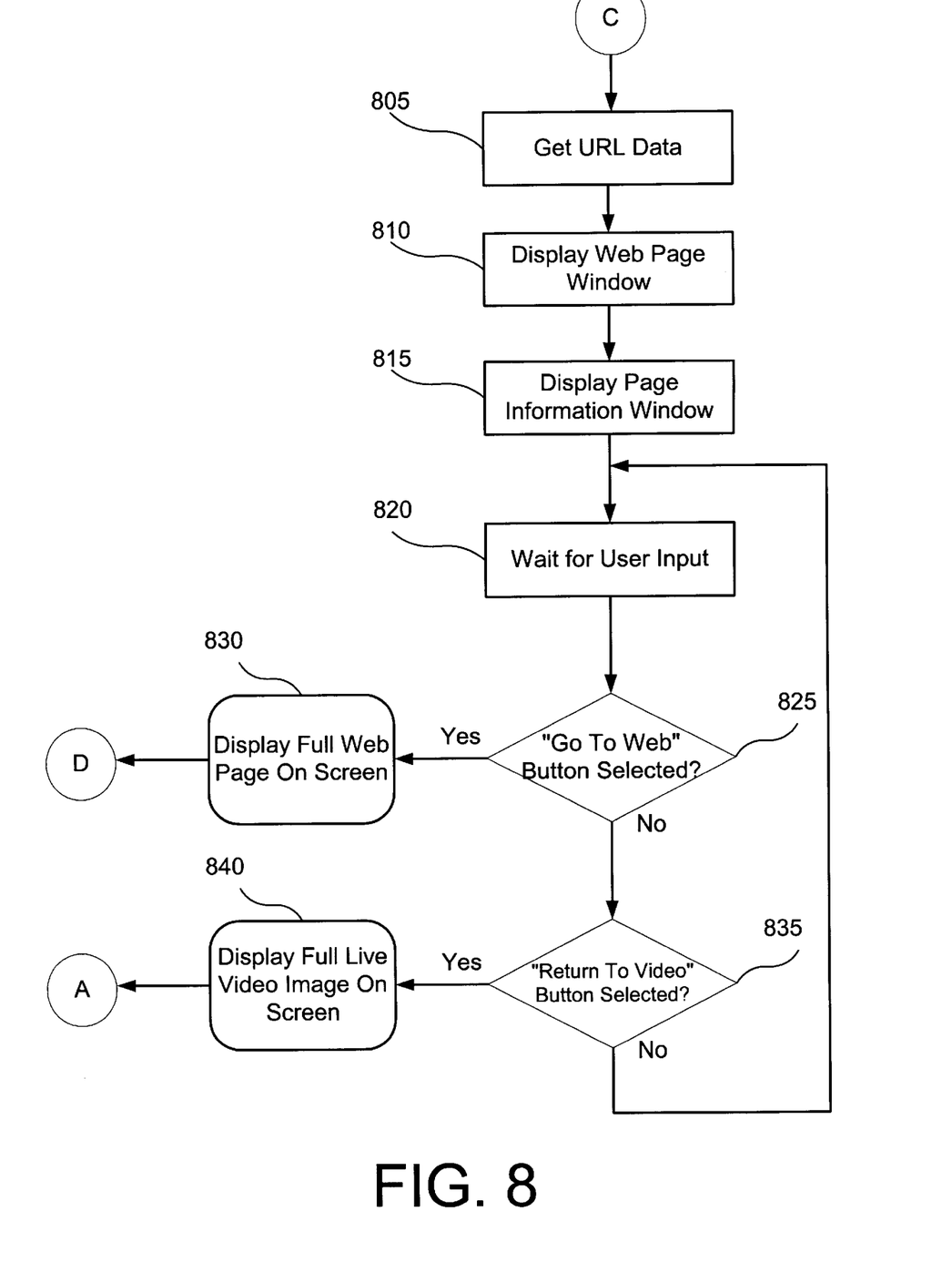
FIG. 8 is a flowchart of preferred method steps for performing the web-results mode of FIG. 5(c).

Referring now to FIG. 8, a flowchart of preferred method steps for performing the web-results mode is shown. Initially, in step 805, search manager 310 manipulates the URL address entered by the user in URL address entry area 535 by first formatting the search text in a proper form for the specified task. In the preferred embodiment, the text is formatted in proper URL format to perform a search on Internet 110. The system sends the request to Internet 110 and acquires the Internet data page.

Next, in step 810, search manager 310 displays the acquired Internet data page as web page window 555 on the television viewing screen as shown in FIG. 5(c). In the preferred embodiment, web page window 555 is superimposed in the upper right-hand corner of the television viewing screen. Then, in step 815, search manager 310 displays page information window 560 on the television viewing screen. Page information window 560 contains information about web page window 555 that was returned as a result of the Internet search process. In the preferred embodiment, page information window 560 is superimposed on the lower third of the television viewing screen as shown in FIG. 5(c).

Next, in step 820, search manager 310 waits for the user to input commands from remote control 270 during a web-results mode. In step 825, search manager 310 determines if the user has pressed "Go To Web" button 570 on remote control 270. If "Go To Web" button 570 has not been pressed, search manager 310 continues processing at step 835. If "Go To Web" button 570 has been pressed, search manager 310, at step 830, displays the acquired Internet data page on the television viewing screen so that the Internet data page occupies the entire screen area. After displaying the Internet data page, the system then waits for further user input. At this stage, the user may elect to retrieve other Internet data pages or return to video-viewing mode (FIG. 6).

Next, at step 835, search manager 310 determines if the user has pressed "Return To Video" button 565 on remote control 270. If "Return To Video" button 565 has not been pressed, search manager 310 continues processing by returning to step 820. If "Return To Video" button 565 has been pressed, search manager 310, at step 840, displays the video-viewing mode screen on the television viewing screen and returns to video-viewing mode (FIG. 6).

The invention has been explained above with reference to a preferred embodiment. Other embodiments will be apparent to those skilled in the art in light of this disclosure. For example, the present invention may be readily implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A device for capturing image data, comprising:

a display coupled to said device to show a signal from a transmission source during a viewing mode;

a capture manager configured to capture said image data from said signal during said viewing mode; and an interface manager configured to show information windows on said display during said viewing mode, said interface manager showing an address input window for entering information to access a web page from an Internet network and a captured frame window for showing said image data on said display in response to a freeze-frame control option.

2. The system of claim 1 wherein said information is entered into a text input area of said address input window.

3. The device of claim 1 wherein said capture manager stores said image data as a plurality of captured image screens.

4. The device of claim 3 wherein said interface manager shows one of said captured image screens on said display in response to a prior-image control option.

5. The device of claim 1 further comprising:

a search manager configured to retrieve data pages from a networked source.

6. The device of claim 5 wherein said search manager retrieves a plurality of said data pages from an Internet network.

7. The device of claim 5 further comprising:

a web page window for showing one of said data pages on said display.

8. The device of claim 7 further comprising:

a page information window for showing file information for said one of said data pages on said display.

9. The device of claim 8 wherein said interface manager shows said page information window and said web page window on said display in response to a go-to-page control option.

10. The device of claim 5 wherein said search manager switches to said viewing mode in response to a return-to-video control option.

11. The device of claim 5 further comprising:

a set-top box configured to retrieve said data pages; and an input device for controlling said set-top box.

12. A system for capturing image data, comprising:
  means for showing a signal from a transmission source on a display during a viewing mode;
  means for capturing said image data from said signal during said viewing mode;
  means for showing said image data in a captured frame window on a first portion of said display during said viewing mode and in response to a freeze frame control option;
  means for showing an address input window on a second portion of said display during said viewing mode and in response to said freeze frame control option; and
  means for entering information into said address input window to access a web page from an Internet network.

13. The system of claim 12 wherein said information is entered into a text input area of said address input window.

14. The system of claim 12 further comprising:
  means for storing said image data as a plurality of captured image screens; and
  means for showing one of said captured image screens on a third portion of said display during said viewing mode.

15. The system of claim 12 further comprising:
  means for retrieving a data page from a network source, wherein said data page is identified by said information;
  means for showing a page information window on a fourth portion of said display during said viewing mode; and
  means for showing said data page on a fifth portion of said display during said viewing mode.

16. The system of claim 15 wherein said data page is obtained from an Internet network.

17. A method for capturing image data, comprising the steps of:
  showing a signal from a transmission source on a display during a viewing mode;
  capturing said image data from said signal during said viewing mode;
  showing said image data in a captured frame window on a first portion of said display during said viewing mode and in response to a freeze frame control option;
  showing an address input window on a second portion of said display during said viewing mode and in response to said freeze frame control option; and
  entering information into said address input window to access a web page from an Internet network.

18. The method of claim 17 wherein said information is entered into a text input area of said address input window.

19. The method of claim 17 further comprising the steps of:
  storing said image data as a plurality of captured image screens; and
  showing one of said captured image screens on a third portion of said display during said viewing mode.

20. The method of claim 17 further comprising the steps of:
  retrieving a data page from a network source, wherein said data page is identified by said information;
  showing a page information window on a fourth portion of said display during said viewing mode; and
  showing said data page on a fifth portion of said display during said viewing mode.

21. The method of claim 20 wherein said data page is obtained from an Internet network.

22. A computer-readable medium comprising program instructions for capturing image data, by performing the steps of:
  showing a signal from a transmission source on a display during a viewing mode;
  capturing said image data from said signal during said viewing mode;
  showing said image data in a captured frame window on a first portion of said display during said viewing mode and in response to a freeze frame control option;
  showing an address input window on a second portion of said display during said viewing mode and in response to said freeze frame control option; and
  entering information into said address input window to access a web page from an Internet network.

23. The medium of claim 22 wherein said information is entered into a text input area of said address input window.

24. The medium of claim 22 further comprising the steps of:
  storing said image data as a plurality of captured image screens; and
  showing one of said captured image screens on a third portion of said display during said viewing mode.

25. The medium of claim 22 further comprising the steps of:
  retrieving a data page from a network source, wherein said data page is identified by said information;
  showing a page information window on a fourth portion of said display during said viewing mode; and
  showing said data page on a fifth portion of said display during said viewing mode.

26. The medium of claim 25 wherein said data page is obtained from an Internet network.

* * * * *